United States Patent [19]

Kesten et al.

[11] Patent Number: 4,712,610
[45] Date of Patent: Dec. 15, 1987

[54] CHEMICAL HEAT PIPE EMPLOYING SELF-DRIVEN CHEMICAL PUMP BASED ON A MOLAR INCREASE

[75] Inventors: Arthur S. Kesten, West Hartford; Alan F. Haught, Glastonbury; Harold T. Couch, Simbury, all of Conn.

[73] Assignee: United Technologies Corporation, Hartford, Conn.

[21] Appl. No.: 936,048

[22] Filed: Nov. 28, 1986

[51] Int. Cl.[4] .............................................. F28D 21/00
[52] U.S. Cl. ................................ 165/104.12; 60/649; 60/673; 62/467
[58] Field of Search ..................... 165/104.12; 60/673, 60/649; 62/467

[56] References Cited

U.S. PATENT DOCUMENTS

| | | | |
|---|---|---|---|
| 3,258,925 | 7/1966 | Barthelemy | 60/649 |
| 3,370,420 | 2/1968 | Johnson | 60/649 |
| 3,511,049 | 5/1970 | Norton et al. | 60/673 |
| 3,738,103 | 6/1973 | Rudolph et al. | |
| 3,943,719 | 3/1976 | Terry et al. | |
| 4,346,752 | 8/1982 | Kesten et al. | |

Primary Examiner—Albert W. Davis, Jr.
Attorney, Agent, or Firm—A. Dean Olson

[57] ABSTRACT

A chemical pump system that utilizes a self-driven compressor to increase the system pressure while obviating the need for a one-way valve and liquid head to provide the driving force for the reactants, thus enhancing long distance transport. The system comprises a chemical heat pipe employing reversible endothermic/exothermic chemical reactions to transfer thermal energy between a heat source and a heat sink. At least one reactant is self-driven substantially unidirectionally through the heat pipe by compressing the reactant(s) with a compressor and heating the reactant(s) to a predetermined pressure and temperature sufficient to form a reaction product having at least a 150% molar increase. The reaction product is expanded with an expander that is linked mechanically to the compressor. The expansion energy is sufficient to compress the reactants to the predetermined pressure while maintaining the self-driven unidirectional flow.

4 Claims, 1 Drawing Figure

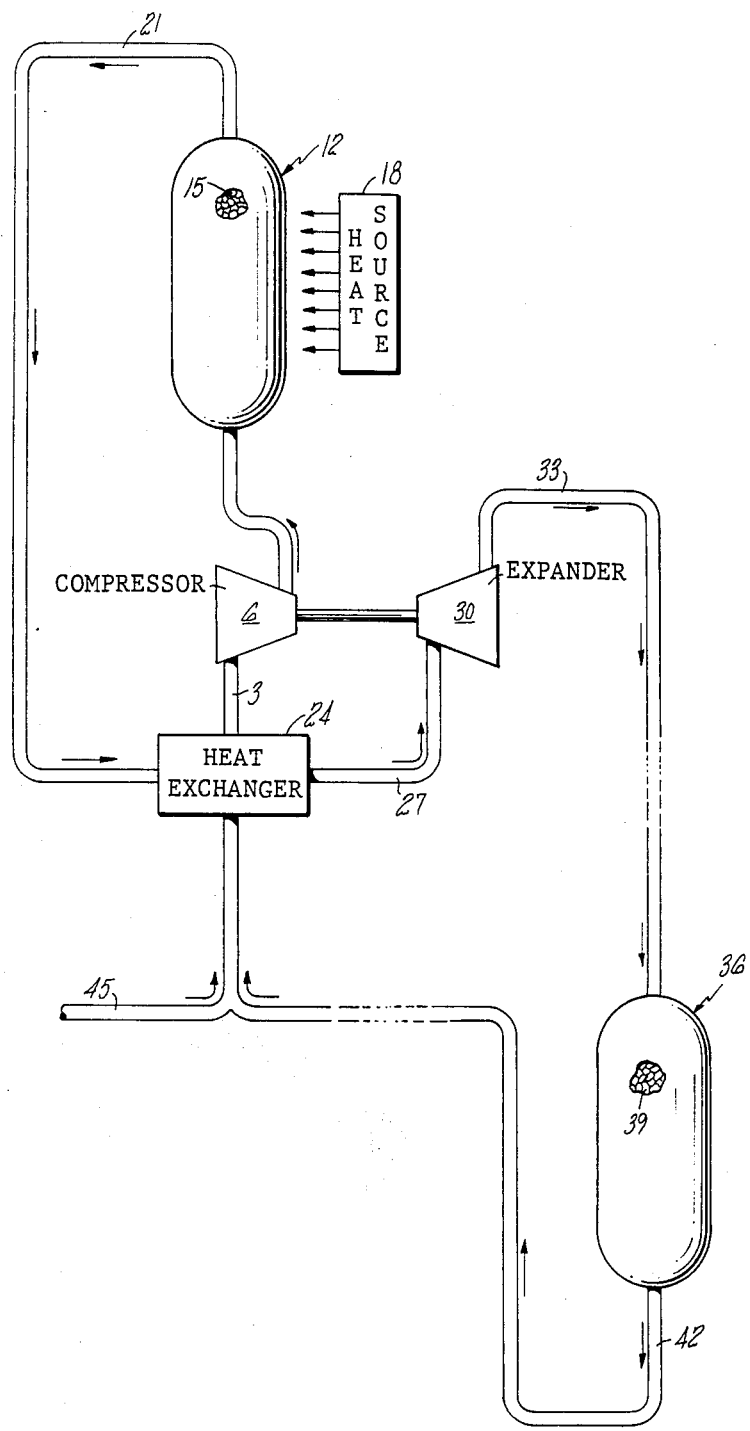

CHEMICAL HEAT PIPE EMPLOYING SELF-DRIVEN CHEMICAL PUMP BASED ON A MOLAR INCREASE

DESCRIPTION

1. Technical Field

The field of art to which this invention pertains is a method for transporting thermal energy, particularly a self-driven system for the transport of heat in the form of chemical energy.

2. Background Art

Heat pipes have been especially useful in efficient transport of thermal energy between a thermal source and a thermal sink or load over short distances. However, typical vaporization/condensation heat pipes may experience significant radiation convection and conduction losses to the environment when the transport path is relatively long, i.e. greater than 10 feet. To accomplish efficient transport over longer distances, resort has been made to reversible chemical heat pipe systems in which reactant(s) undergo an endothermic chemical reaction at the heat source and a second exothermic chemical reaction at the heat sink. This reduces the potential for thermal loss from the system as the reactant(s) and/or reaction products may be transported at temperatures similar to that of the environment.

Commonly assigned U.S. Pat. No. 4,346,752, the diclosure of which is hereby incorporated by reference, discloses a self-driven system employing a chemical heat pipe. In that patent, a selective valve system is used which comprises a liquid medium through which reactant may flow but which effectively blocks the reverse flow of reaction products. In that system, the chemistry of the reaction process and the selective valve technique operate to establish a substantially unidirectional flow of the reactant and reaction products and accomplish transport of the reactant and the reaction products without the insertion of conventional pumps into the heat pipe system. Although this system functions well, the use of a liquid head for a one-way valve (e.g., when the liquid head is necessarily large) for particular applications can have problems.

Accordingly, there is a constant search in this field of art for new systems for transporting thermal energy via chemical heat pipes.

3. Disclosure of Invention

This invention is directed to a chemical pump system that utilizes a self-driven compressor to increase the system pressure while obviating the need for a one-way valve and liquid head to provide the driving force for the reactants, thus enhancing long distance transport. The system comprises a chemical heat pipe employing reversible endothermic/exothermic chemical reactions to transfer thermal energy between a heat source and a heat sink. At least one reactant is self-driven substantially unidirectionally through the heat pipe by compressing the reactant(s) with a compressor and heating the reactant(s) to a predetermined pressure and temperature sufficient to form a reaction product having at least a 150% molar increase. The reaction product is expanded with an expander that is linked mechanically to the compressor. The expansion energy is sufficient to compress the reactants to the predetermined pressure while maintaining the self-driven unidirectional flow.

The foregoing and other objects, features and advantages will be apparent from the specification, claims and from the accompanying drawings which will illustrate an embodiment of the invention.

BRIEF DESCRIPTION OF DRAWINGS

The FIGURE is a generalized schematical diagram of the chemical heat pipe employing the molar increase self-driving process of this invention.

BEST MODE FOR CARRYING OUT THE INVENTION

According to the FIGURE, gaseous reactants 3 (described below) at ambient pressures are compressed in a conventional compressor 6 to a predetermined pressure and displaced to a reactor 12 adjacent to a heat source 18. In reactor 12, the gaseous reactants undergo an endothermic chemical reaction, preferably in the presence of catalysts 15 (described below) resulting in reaction products 21. Typically, the endothermic reaction requires the addition of heat through heat source 18. The compression afforded by compressor 6 is insufficient to elevate the reactants to a temperature sufficient to react. Thus, the predetermined pressure increase in combination with the addition of heat should be sufficient to enable the endothermic reaction to proceed.

The reactants (chemicals) can be from a source 45 and/or recycled reactants 42. The chemicals used in this system should be such that the reaction results in an increase in moles. This increase in moles is preferably greater than about 150% of the original reactants. For chemical systems with an increase in moles less than about 150%, the attendant advantages afforded by this system are offset by the energy losses due to friction, conduction, etc. There are a variety of chemical systems generically described as simple, reversible reaction systems which are particularly adapted for use in chemical heat pipes. Exemplary systems comprise methylcyclohexane/toluene, $SO_3/SO_2$, cyclohexane/benzene and the steam reforming system depicted below.

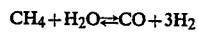

$$CH_4 + H_2O \rightleftharpoons CO + 3H_2$$

Those skilled in the art will conceive of other systems. It is preferable to use the methylcyclohexane/toluene system as a modest temperature chemical heat pipe because of the easy reversibility of the reaction.

The catalysts used will be determined by the chemical reactants used. Thus, for a methylcyclohexane/toluene system, the preferred catalysts are noble metals for the methylcyclohexane dehydrogenation and nickel or noble metals for the hydrogenation reaction.

Returning to the FIGURE, the reaction products 21, present in a larger number of moles, are displaced through an expander 30, such as a conventional turbine. The volumetric increase in reaction product is translated into mechanical energy. Turbine 30 is mechanically or electrically linked to compressor 6 so that the volumetric increase is used to compress the reactants 3 affording a self-driven transport system. The self-pumping configuration may comprise any positive displacement compression or expansion element or any other mechanical compressor/expander configuration such as an axial flow rotary compressor/expander. The pressure subsequent to expansion must be greater than the pressure associated with a system which contains no expander/compressor combination. Thus, the expander turbine provides sufficient energy to the compressor turbine in order to assure a net pressure increase allowing for turbine/compressor inefficiencies.

In a preferred embodiment of this invention, the hot reaction products are cooled through a heat exchange system 24 with the initial reactants 3 in order to raise their temperature. This heat exchange embodiment is particularly adapted for low temperature chemical heat pipe systems based upon the hydrogenation of toluene for the transportation of hydrogen or energy over a distance of several miles. A considerable advantage in system utility is gained if the conduit lines can remain uninsulated. If this is done, the methylcyclohexane feed stream will return from a remote location at a centrally ambient temperature, and it is efficient to regeneratively heat this stream by heat exchange with the reactant product stream to recover as much of the sensible and latent heat as possible. It is preferable to place the compressor of the self-powered chemical pump system between the regenerative exchanger and the dehydrogenation reactor in order to maximize the regenerative recovery of latent heat. This results in the incoming reactant stream vaporizing at a low temperature. It is also preferable to place the reactant products stream expander downstream of the regenerator so that the hydrocarbon component condenses at a relatively high temperature and is thereby capable of transferring most of its latent heat to the incoming methylcyclohexane stream. It is unusual that this system is desirable because it can be disadvantageous to the chemical pump system since it compresses a hot gas stream while expanding a relatively cold two-phase stream. However, it results in better temperature matching for the endothermic reaction process along with effective heat regeneration.

For systems where some of the heat of compression is used for regenerative heating, there exists a preferential amount of compression. This is a factor of about 2.5 for the methylcyclohexane system described here. Above this preferential compression range, the efficiency of the expander/compressor system falls because of increased regenerative heat transfer.

The expanded reaction product 33 subsequent to expansion 30 is self-driven and may be transported to a desired location. Preferably, the reaction products are transported to a second, exothermic reactor 36 where they are reacted, preferably with a catalyst 39, such as nickel yielding a source of energy. It is especially preferred that the expander 30 is separated from the exothermic reactor 36 by a distance greater than about one mile because at these distances, this system has its greatest advantages. Over these long distances, this system works better than the system described in commonly owned U.S. Pat. No. 4,346,752 because of the higher pressures at point 33 downstream of the endothermic reactor 12. Subsequent to the exothermic reaction and simultaneous transformation of reaction products into the reactants, the reactants 42 may be utilized for any general purpose or transported and used as a source of reactant to be compressed at compressor 6 and optionally heated through exchange with reaction products 21.

The thermodynamics for these systems are described empirically below.

EXPLANATION OF SYMBOLS $C_p$: Specific heat at constant pressure
$C_v$: Specific heat at constant volume
ds: Entropy change
dq: Heat absorbed
$\eta_c$: Compressor efficiency
$\eta_e$: Expander efficiency
p: Pressure
R: Gas constant
T: Temperature
v: Molar volume
W: Work done by the system.

For a reversible adiabatic change of state:

$$Tds = dq = 0 \tag{1}$$

For an ideal gas:

$$C_p dv/v + C_v dp/p = 0 \tag{2}$$

Reorganizing:

$$C_p/C_v \, dv/v + dp/p = 0 \tag{3}$$

Assuming $C_p/C_v$ is a constant k:

$$k \ln v = \ln p = k \tag{4}$$

(constant of integration)
Or $$pv^k = k_1 \tag{5}$$

And $$pv^k = p_1 v_1^k = p_2 v_2^k = \ldots \tag{6}$$

Where $$k = C_p/C_v \tag{7}$$

Combining (5) and the ideal-gas equation for v,T $$Tv^{k-1} = K_2 \tag{8}$$

Combining (5) and the ideal-gas equation for p,T $$Tp^{1-k/k} = K_3 \tag{9}$$

Substituting (6) into $$W = \int_{v_2}^{v_1} p \, dv \tag{10}$$

$$W = p_1 v_1^k \int_{v_1}^{v_2} dv/v^k$$

Rearranging $$W = \frac{p_1 v_1}{1-k}(v_2^{1-k} - v_1^{1-k}) \tag{11}$$

Rearranging $$W = \frac{p_1 v_1 - p_2 v_2}{k-1} \tag{12}$$

$$v_2 = V_1 (p_1/p_2)^{1/k} \tag{13}$$

Substitution $$W = \frac{p_1 v_1}{k-1}[1 - (p_2/p_1)^{k-1/k}] \tag{14}$$

Ideal Gas Law $$W = \frac{RT_1}{k-1}[1-(p_2/p_1)^{k-1/k}] \quad (15)$$

Equations 14 and 15 give the theoretical adiabatic work per mole for either compression or expansion, when $p_1$ always refers to the initial pressure for either gas.

The total work for an ideal compressor or expander cycle is given by $$W_{cycle} = p_1v_1 - p_2v_2 + \int_{v_1}^{v_2} p\, dv \quad (16)$$

where the integral is given by Eq. 15. From Eq. 13 we see that $$p_1v_1 - p_2v_2 = p_1v_1\left[1-\left(\frac{P_2}{P_1}\right)^{\frac{k-1}{k}}\right] \quad (17)$$

Combining Eqs. 15 and 17, Eq. 16 becomes $$W_{cycle} = \frac{k}{k-1}RT_1\left[1-\left(\frac{p_2}{p_1}\right)^{\frac{k-1}{k}}\right] \quad (18)$$

Applicant's self-driven system is depicted empirically below.

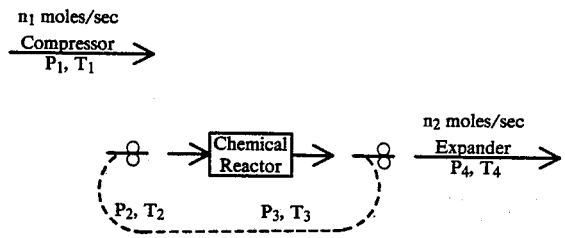

$n_1$ moles/sec
Compressor
$P_1, T_1$ $P_2, T_2 \quad P_3, T_3$ $n_2$ moles/sec
Expander
$P_4, T_4$ Therefore, the expressions for compression work and expander work are:

$$\text{Compressor Work/sec.} = \frac{n_1 k RT_1}{k-1}\left[1-\left(\frac{P_2}{P_1}\right)^{\frac{k-1}{k}}\right] \quad (19)$$

$$\text{Expander Work/sec.} = \frac{n_2 k RT_3}{k-1}\left\{1-\left(\frac{p_4}{p_3}\right)^{\frac{k-1}{k}}\right\} \quad (20)$$

In this system's self-driven mode, the work recovered from the expander turbine is used to power the compressor, and taking the sum of equations 19 and 20 as zero gives the discharge to inlet pressure ratio $P_4/P_1$ generated. Assuming for simplicity an isothermal chemical reaction $T_3 = T_2$ and negligible pressure drop through the reactor $P_3 = P_2$, the self-pumping discharge to inlet pressure ratio is $$\frac{p_4}{p_1} = \left\{\frac{n_1}{n_2} + \left(1-\frac{n_1}{n_2}\right)\left(\frac{p_2}{p_1}\right)^{\frac{k-1}{k}}\right\}^{k/k-1} \quad (21)$$

For conventional compressors and expanders having $_c$ and $_e$ efficiency respectively, discharge to inlet pressure ratio can be approximated by $$\frac{p_4}{p_1} = \left(\frac{p_2}{p_1}\right)\left\{1-\frac{n_1}{n_2}\left[\frac{\frac{1}{\eta_c\eta_e}\left[\left(\frac{p_2}{p_1}\right)^{\frac{k-1}{k}}-1\right]}{1+\frac{1}{\eta_c}\left[\left(\frac{p_2}{p_1}\right)^{k-1/k}-1\right]}\right]\right\}^{\frac{k}{k-1}} \quad (22)$$

Utilizing the above compressor and expander efficiencies, the "pump" discharge pressure ratios are substantial as shown in Table I below.

TABLE I

Pressure Ratio (Discharge-to-Unlet)
Developed for Various Molar
Multiplication and Inlet Compression
Case I: Isothermal Reactor
Compressor Efficiency = 80%
Expander Efficiency = 88%

| Molar Ratio ($n_2/n_1$) | Compression Ratio ($P_2/P_1$) | Output-to-Inlet Pressure Ratio* ($P_4/P_1$) k = 1.071 |
|---|---|---|
| 2. | 2. | 1.233 |
|  | 3. | 1.405 |
|  | 5. | 1.670 |
|  | 10. | 2.142 |
| 3. | 2. | 1.451 |
|  | 3. | 1.817 |
|  | 5. | 2.429 |
|  | 10. | 3.643 |
| 4. | 2. | 1.574 |
|  | 3. | 2.063 |
|  | 5. | 2.919 |
|  | 10. | 4.720 |

*Cp = 30 cal/deg. mole

EXAMPLE

Referring to the FIGURE, a stream comprising 0.9 moles methylcyclohexane, 0.1 mole toluene and 0.3 mole hydrogen at 25° C. and 2 atmospheres enters regenerator 24, is heated and at the entrance (3) of the compressor (6) is at 205° C. and 2 atmospheres. An 80% efficient compressor (6) compresses the reactants to 242° C. and 5 atmospheres. In the reactor 12, the reactants are heated by heat source (18) to 310° C. and 5 atmospheres. The methylcyclohexane is dehydrogenated in the presence of a noble metal catalyst forming 0.9 mole toluene, 0.1 mole methylcyclohexane and 2.7 moles hydrogen at 310° C. and 5 atmospheres. At the heat exchanger 24, the reaction products are cooled to 80° C. at 5 atmospheres. The reaction products are expanded to 59° C. and 2.1 atmospheres by an 88% efficient expander. The effective molar multiplication ratio is $n_2/n_1 = 2.8/1.3 = 2.154$ since most of the hydrocarbon component has condensed by the time the "toluene" stream enters the expander.

Table II (below) summarizes the range discharge pressures obtained for various compressor pressure ratios for a methylcyclohexane/toluene system (as described above) where the reactants are regeneratively heated by heat exchange with the product stream. The table details how the achievable pump discharge to inlet pressure ratio actually maximizes with an inlet compression ratio between 2 and 2.5 to 1 (4 to 5 atmospheres) and then begins to decrease. This is believed to be a consequence of the disparity between compressor outlet and expander inlet temperatures.

TABLE II

Pressure Ratio (Discharge-to-Inlet Developed in Self-Driven Chemical Heat Pipe Configuration with Regeneration
Case II: Regenerative Reactor Configuration of FIG. 2
Compressor Efficiency = 80%
Expander Efficiency = 88%
$P_1$ = 2 atm. (inlet)

| $P_2$ | $T_2$ | $T_3$ | $(P_4/P_1)$ | $P_4$ | $T_4$ |
|---|---|---|---|---|---|
| 3. atm. | 221° C. | 80° C. | 1.034 | 2.069 atm. | 71° C. |
| 4. | 233 | " | 1.047 | 2.094 | 64 |
| 5. | 242 | " | 1.050. | 2.099 | 59 |
| 7. | 257 | " | 1.040 | 2.079 | 51 |
| 10. | 272 | " | 1.012 | 2.023 | 42 |

Although this invention has been described in terms of a chemical heat pipe system for the long distance transport of heat or hydrogen, its utilization in any chemical system involving an increase in molar volumetric flow is feasible. Thus, exemplary alternate uses are reactor systems used to promote decomposition reactions such as dehydrogenation or dehydration.

This chemical pump system makes an advance to this field of art by providing a self-driven compressor to increase the system pressure to overcome friction and resistance enhancing long distance transport. In addition, it obviates the need for a one-way valve and liquid head to provide the driving force for the reactants.

It should be understood that the invention is not limited to the particular embodiment shown and modifications may be made without departing from the spirit or scope of this concept as defined by the following claims.

We claim:

1. In a chemical heat pipe employing reversible endothermic/exothermic chemical reactions to transfer thermal energy between a heat source and a heat sink the method of self-driving at least one reactant substantially unidirectionally through said heat pipe comprising:
   (a) compressing said reactant(s) with a compressor and heating said reactant(s) to a predetermined pressure and temperature sufficient to endothermically react said reactant(s) to form reaction product having at least a 150% molar increase thereby establishing said self-driving unidirectional flow;
   (b) transferring heat from said reaction product to said reactants; and
   (c) expanding said reaction product with an expander linked mechanically to said compressor whereby said expansion energy is sufficient to compress said reactants to said predetermined pressure while maintaining said self-driving unidirectional flow.

2. The method of claim 1 wherein a predetermined quantity of thermal energy is transferred from said reaction product to said reactants.

3. The method of claim 1 wherein said reactant comprises methylcyclohexane, cyclohexane, $SO_3$ or $CH_4/H_2O$.

4. The method of claim 1 wherein said reaction product is transported over a distance greater than about one mile.

* * * * *